United States Patent
McIntosh et al.

(10) Patent No.: US 10,425,455 B2
(45) Date of Patent: *Sep. 24, 2019

(54) PRIORITIZATION IN A CONTINUOUS VIDEO PLAYBACK EXPERIENCE

(71) Applicant: KNAPP INVESTMENT COMPANY LIMITED, Tortola (VG)

(72) Inventors: David McIntosh, Del Mar, CA (US); Max Crane, Del Mar, CA (US); Chris Pennello, Berkeley, CA (US)

(73) Assignee: KNAPP INVESTMENT COMPANY LIMITED, Road Town (VG)

( * ) Notice: Subject to any disclaimer, the term of this patent is extended or adjusted under 35 U.S.C. 154(b) by 204 days.

This patent is subject to a terminal disclaimer.

(21) Appl. No.: 15/614,295

(22) Filed: Jun. 5, 2017

(65) Prior Publication Data
US 2017/0272482 A1    Sep. 21, 2017

Related U.S. Application Data

(60) Continuation of application No. 14/460,257, filed on Aug. 14, 2014, now Pat. No. 9,712,586, which is a
(Continued)

(51) Int. Cl.
| | |
|---|---|
| *G06F 15/16* | (2006.01) |
| *H04L 29/06* | (2006.01) |
| *H04N 21/25* | (2011.01) |
| *H04N 21/258* | (2011.01) |
| *H04N 21/4788* | (2011.01) |
| *H04N 21/482* | (2011.01) |
| *G06F 3/0484* | (2013.01) |

(52) U.S. Cl.
CPC .......... *H04L 65/60* (2013.01); *G06F 3/04842* (2013.01); *H04N 21/252* (2013.01); *H04N 21/25891* (2013.01); *H04N 21/4788* (2013.01); *H04N 21/4826* (2013.01)

(58) Field of Classification Search
CPC ....................................................... H04L 65/60
USPC ................................................. 709/203, 206
See application file for complete search history.

(56) References Cited

U.S. PATENT DOCUMENTS

| | | | |
|---|---|---|---|
| 5,687,160 A | 11/1997 | Aotake et al. | |
| 6,147,687 A * | 11/2000 | Wanderski | G06F 3/0481 715/853 |

(Continued)

OTHER PUBLICATIONS

Non-Final Office Action, dated Oct. 30, 2013, for U.S. Appl. No. 12/953,386, 11 pages.
(Continued)

*Primary Examiner* — Duyen M Doan
(74) *Attorney, Agent, or Firm* — Anova Law Group, PLLC

(57) ABSTRACT

Methods, systems, and apparatus can provide ordered (e.g. ranked) lists of content items as a suggested list of items to watch. The ordered list can be based on feedback from other users. The content items can also be presented (e.g. in a continuous playback mode) to a passive user so that the user does not have to actively select a next item to watch. This passive mode can select a next item (e.g. from a list that is updated based on recent user feedback), and the item can be queued on a client device for playing to a user. Content items can also be provided from different independent servers.

13 Claims, 12 Drawing Sheets

Related U.S. Application Data division of application No. 12/953,386, filed on Nov. 23, 2010, now Pat. No. 8,880,623.

(60) Provisional application No. 61/266,034, filed on Dec. 2, 2009.

(56) References Cited

U.S. PATENT DOCUMENTS

| | | | |
|---|---|---|---|
| 6,389,467 | B1 | 5/2002 | Eyal |
| 8,065,708 | B1 | 11/2011 | Smyth |
| 8,224,986 | B1 | 7/2012 | Liskov |
| 2002/0194607 | A1 | 12/2002 | Connelly |
| 2003/0048418 | A1* | 3/2003 | Hose .............. G03B 21/04 352/123 |
| 2004/0194150 | A1 | 9/2004 | Banker |
| 2006/0026218 | A1* | 2/2006 | Urmston ............ G06F 11/1451 |
| 2006/0293909 | A1* | 12/2006 | Miyajima ............ G01D 5/345 709/204 |
| 2008/0069480 | A1 | 3/2008 | Aarabi et al. |
| 2008/0209066 | A1 | 8/2008 | Spio |
| 2009/0006542 | A1 | 1/2009 | Feldman et al. |
| 2009/0158214 | A1 | 6/2009 | Arnold et al. |
| 2009/0287655 | A1 | 11/2009 | Bennett |
| 2009/0327222 | A1 | 12/2009 | Spitzer-Williams |
| 2010/0057928 | A1 | 3/2010 | Kapoor |
| 2010/0077017 | A1 | 3/2010 | Martinez |
| 2010/0082731 | A1 | 4/2010 | Haughay |
| 2011/0289139 | A1 | 11/2011 | McIntosh |
| 2012/0141095 | A1 | 6/2012 | Schwesinger et al. |

OTHER PUBLICATIONS

Notice of Allowance, dated Apr. 29, 2014, for U.S. Appl. No. 12/953,386, 14 pages.

Non-Final Office Action, dated Apr. 22, 2016, for U.S. Appl. No. 14/460,257, 15 pages.

Final Office Action, dated Sep. 23, 2016, for U.S. Appl. No. 14/460,257, 9 pages.

Advisory Action, dated Dec. 7, 2016, for U.S. Appl. No. 14/460,257, 4 pages.

Non-Final Office Action, dated Feb. 10, 2017, for U.S. Appl. No. 14/460,257, 12 pages.

* cited by examiner

PRIORITIZATION IN A CONTINUOUS VIDEO PLAYBACK EXPERIENCE

CROSS-REFERENCE TO RELATED APPLICATIONS

The present application is a continuation of U.S. application Ser. No. 14/460,257, entitled "Prioritization in a Continuous Video Playback Experience" filed Aug. 14, 2014, which is a divisional of U.S. application Ser. No. 12/953,386, entitled "Prioritization in a Continuous Video Playback Experience" filed Nov. 23, 2010, which claims priority from and is a non-provisional application of U.S. Provisional Application No. 61/266,034, entitled "Method For Crowd Sourcing A Continuous Video Playback Experience" filed Dec. 2, 2009, the entire contents of which are herein incorporated by reference for all purposes.

FIELD

Embodiments of the present invention relate generally to providing content to users, and more particularly to prioritizing display of content and displaying a continuous stream of various content files to users.

BACKGROUND

It has become common for people to post videos on websites so that other people can watch the videos. The poster's purpose may be to gain notoriety or just to allow friends to easily watch videos. However, as there are many videos, it can be hard selecting which ones to watch. There are search mechanisms, but a lot of time can be spent searching and watching videos that are not enjoyable to the viewer. People can send links to videos to their friends, but to view the video a person would need to wade through multiple e-mails, select a link in a particular e-mail, and watch each video. Even if a person's friends were active enough to send many links to a user, a person may not know which of the many videos are good. This process can also be frustrating to a viewer, who has become accustomed to watching video in a more passive manner (e.g. as watching TV).

Therefore, it is desirable to have methods, apparatus, and systems that provide desirable content to a viewer, and in a desirable manner.

BRIEF SUMMARY

Embodiments of the present invention can provide ordered (e.g. ranked) lists of content items as a suggested list of items to watch. In one embodiment, the ordered list is based on feedback from other users. The content items can also be presented to a passive user so that the user does not have to actively select a next item to watch. This passive mode can select a next item (e.g. from a list that is updated based on users' recent feedback), and the item can be queued on a client device. Content items can also be provided from different independent servers.

According to one embodiment, a method of providing image content to a user is provided. A server system receives links associated with a plurality of image content files. The server has a plurality of users. User feedback is received on the image content files. A computer system determines an ordered list of the links based on the user feedback. In various embodiments, the computer system can be the server system or a client device being operated by a user.

According to another embodiment, a method of providing image content to a user. A client device receives a selection of a channel from a user. The channel comprises a list of links to image content files. A request to play the content image files in a continuous playback mode is received. A request is sent to a server system for data associated with one or more of the image content files for the selected channel. The data is received, where an order of the received data is based on feedback from other users about the image content files of the channel.

According to another embodiment, a method of providing content to a user is provided. A client receives a plurality of content items from one or more servers. One or more content files associated with a first set of the content items are received. The first set is at a top of an ordered list of the plurality of content items. A queue is created from the received content files. The client plays to a user the one or more received content files as a stream of content. The client determines whether the queue of remaining content files is smaller than a threshold. When the queue is smaller than the threshold, content files associated with a second set of one or more content items are requested. The second set of content items is to be played following the first set of content items.

According to another embodiment, a method of providing content to a user is provided. A client receives a list of links from one or more servers. The links are associated with a plurality of image content files. One or more content files associated with a first set of the links are received, where the first set of the links are at a top of an order of the list. A queue is created from the received links. The client plays to a user the one or more received content files as a stream of content. The client determines whether the queue of remaining links is smaller than a threshold. When the queue is smaller than the threshold, the client requests from at least one of the servers a second set of one or more links. The second set of content items is to be played following the first set of links.

Other embodiments of the invention are directed to systems, apparatuses, and computer readable media associated with methods described herein.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers can indicate identical or functionally similar elements.

DEFINITIONS

Figure 1:
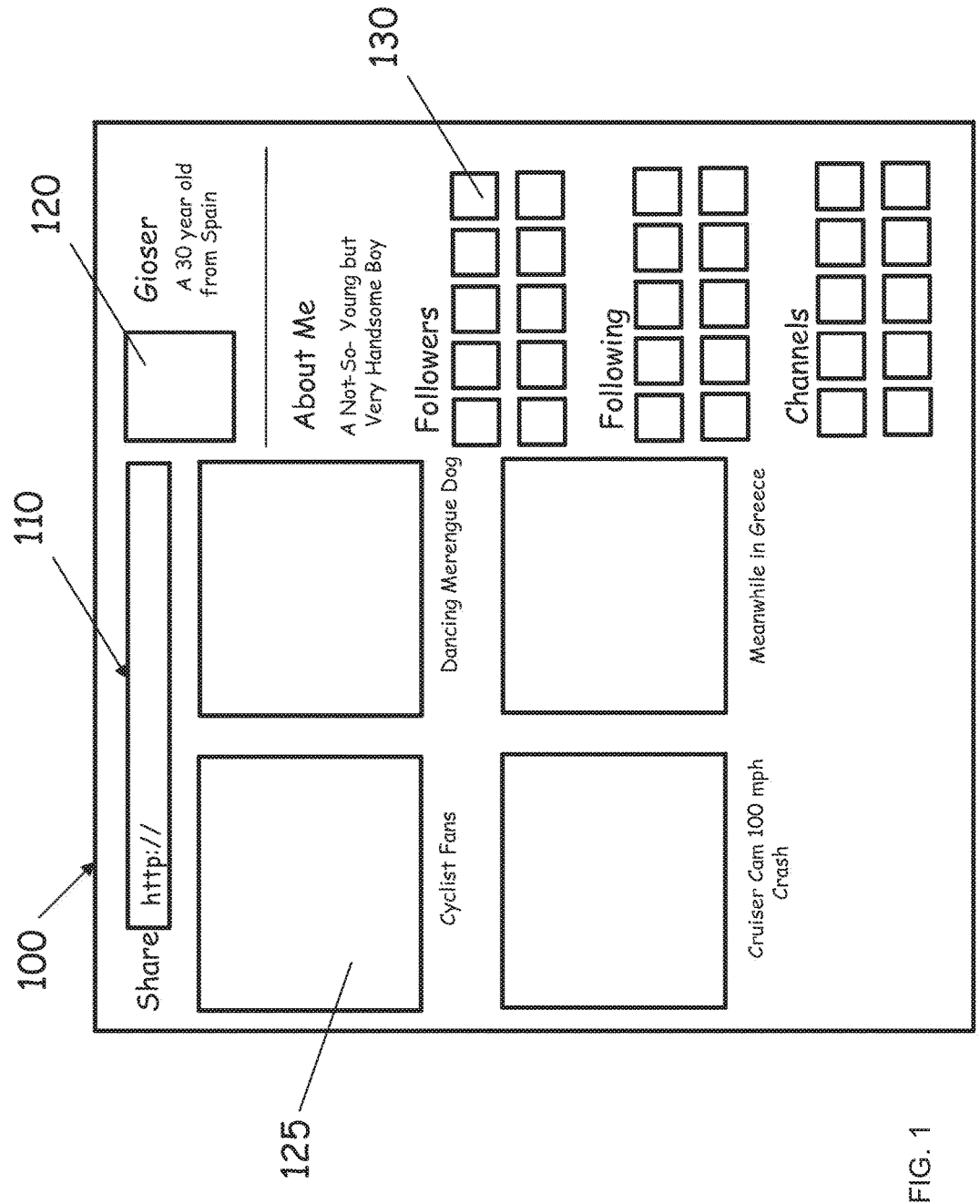
FIG. 1 shows an interface for a website that allows a user to share content image files according to embodiments of the present invention.

As used herein, "content" and "content item" refer to the actual content files or to the links to the content files. As used herein, a "content file" refers to audio or visual files that can be played to a user. As used herein, an "image content file" is a file containing image data, such as a video file or a picture file.

As used herein, a "link" is any reference identifier that refers to content files and can be used to obtain the content files. For example, a link could be a URL that a browser can interpret to provide content files from a web server, or could be an identifier that when presented to a server, the server interprets to provide content stored on the server.

As used herein, a "user" is any person who interacts with one or more servers. For example, a person may interact with a first server, which then interacts with a second server to convey information provided by the person. Thus, the person is a user of both servers. As used herein, an "application page" refers to any window, frame, or other type of page that can appear in an application on a computer.

As used herein, a "channel" or "category" refers to any collection of content, e.g., links and/or image files themselves. In one embodiment, the content of a collection can be directed to a particular type of subject matter. In another embodiment, the content can be directed to or obtained from a particular user or a particular group of users. As used herein, a "view" is an ordered list of the content items of a channel.

DETAILED DESCRIPTION

Most pre-recorded video content on the Internet has a finite beginning and an end. On video sites that store video content, once the play button is activated, the video plays until it reaches the end, and the user has to select a new video. This can be inconvenient because people are accustomed to entertainment letting the person sit back and relax. Yet once a video has finished playing, current methods require users to click on other items they want to watch next, or search for other terms. Accordingly, embodiments can provide a video experience from image content files from multiple sources, where a video experience can be a passive stream. Thus, once a given channel is selected, a user can sit back and relax without doing any work. Even if a user does not want a passive video experience, the user may not know which videos will be more interesting until the user watches the video. Accordingly, embodiments can provide an ordering of content so that a user can easily access more interesting videos.

I. Creation of Content

In some embodiments, content stored on a server (e.g. a website) can be provided by users of the server. In other embodiments, content can be created by the administrators (e.g. owners or creators) of a website. In yet another embodiment, a website can have content received from users and from an administrator. The content can be actual files or links to files stored on other servers.

One embodiment provides a server (e.g. a website) where users can upload content items, e.g. image content, audio content (e.g. music), or combinations thereof. The image content can include video or pictures (e.g. one at a time or as a slideshow) with audio potentially included with the image content. In one aspect, a video can be considered a series of pictures (images) stored as a single image content file, and can include video that may be timed with the playing of the pictures. The image content item can be uploaded as an actual file(s) of the image content or as a link to the image content, which can include one or more files at another location. When a link is uploaded, the image content file may be stored at a different website, server, or system that is accessible by a network and has storage capacity for the image files. Note that when a file is uploaded, it still may be accessed with a link. A file can include any accessible content, e.g. including a website that is accessed at a particular location. A file can also be a combination of multiple files, which are combined as a single object.

In one embodiment, if a link is uploaded, a website can retrieve the content file for storage at one or more servers of the website. In another embodiment, only data (a link) about a video is stored on the servers. In one implementation, the link can include another server and an identifier. The other server can use the identifier to determine the actual file being referred to by the link.

FIG. 1 shows an interface 100 for a website that allows a user to share content image files according to embodiments. For example, when a user finds content that the user likes, the user can enter (e.g. cut and paste) a link to the content into a box 110 (e.g. marked as Share). As another example, a user can upload a content file. In one implementation, the website (an example of a server system) can create a link to the content file. As shown, interface 100 shows a page for a particular user 120 of the website. Content items 125 that the user 120 recently shared (e.g. uploaded as a link or file) can be shown. However, in other embodiments, an interface may allow an anonymous user to interact with the website.

Interface 100 for user 120 also displays other users that are followers of user 120, other users that user 120 is following, and channels that the user 120 is following. In one embodiment, if user 120 clicks on an object 130 then a public page of the selected user can be provided. The public page can contain a list of content (e.g. links or thumbnails) that can be watched. In another embodiment, if user 120 clicks on object 130 then a list of links to content are displayed, or actual content in files can start to be displayed. As to the channels, a similar display of links or a streaming of content in content files can be provided. The list of channels can be one that user 120 is specifically following, ones that are popular, new, or are displayed using some other criteria. The icon displayed in an object 130 can be of a user or an image signifying a theme of a channel, or can be an image related to a specific content file for the user channel of the themed channels.

In one embodiment, if multiple users upload the same link, only one link is stored. However, there can be many shares from multiple users that reference the same link. In another embodiment, multiple links can be stored. As to users of a web site, the users can have a user profile, which can be tracked with a username. The user can be made to provide a password when accessing the website.

Regarding the channels, there can be various channels to which content items can be associated. For example, there can be one site-wide stream called the "everyone" channel which contains all of the image content provided by the users on the site (e.g. by providing a link). Other channels can be a subset of the "everyone" stream. In one embodiment, a channel of a particular user can include all of the content items the user has uploaded (shared), commented on, or propped (given a positive indicator). As another example, the content items that have been propped the most can be made into its own channel (e.g. labeled popular). In one embodiment, items that have a certain number (e.g. greater than a threshold) of actions performed on them are put into the popular channel.

In one embodiment, when the user uploads a content item, the user can post the content item to his/her profile and/or label the file as being associated with one or more channels. For instance, there could be a channel dedicated to a certain subjects (e.g. cats or cars). These subject-driven channels can be created by users, suggested by users with an administrator of the website creating the channel if the subject is acceptable, or simply just created by the administrator as a subject about which users will be expected to post content. In one implementation, a channel can have a short name, a full name, and a description. In one embodiment, the user that creates a channel can restrict who can post to the channel.

In addition, a user can set up a channel of the image content that selected users provide (i.e. upload, commented on, or prop). For example, a first user can specify other users (e.g. designated by a user/profile name) that the first user wants to follow. The image content of the selected users can then form a specific channel for the first user. A first user can create multiple such channels, with each channel following a different group of users. The groups can have overlapping users.

As multiple people can contribute to a channel, a channel can be constantly changing, with new content items continually being added. In one embodiment, old content items may be removed so that the stream (content within the channel) does not become too large. In one aspect, this can be done by limiting the number of content items in a stream to a maximum number (e.g. 1000 or 1500). In another embodiment, content is not removed except for specific reasons, which can include a user misspelling the description or a user sharing something objectionable or illegal. In one embodiment, a stream is stored as a list of links to the content of the stream.

In one embodiment, the content of a stream could be created simply as a folder of files that could be browsed or searched. For example, each link or file can have a name associated with it. The links could then be presented in alphabetical order, by date created, or by other criteria. The files could also be searched based on title, user who posted the link (this field may have multiple values since multiple users can post the same file), or other fields. Other fields can include genre, length, descriptions, tags, comments, dimensions (e.g. size), ratings, popularity, and other fields. Embodiments can also provide a suggested playback order.

II. Ordering of Content of a Channel

Although a user could browse or search through content of a specific channel, such a procedure takes up significant time in which the user could otherwise be enjoying watching the content. A user could set the content items to play randomly, but the content items might repeat. Even if the random playback was made not to repeat, there is a chance that the user may be less interested in the videos shown first than other content items. Accordingly, in one embodiment, the links to the various content files of a channel are ordered.

Figure 2:
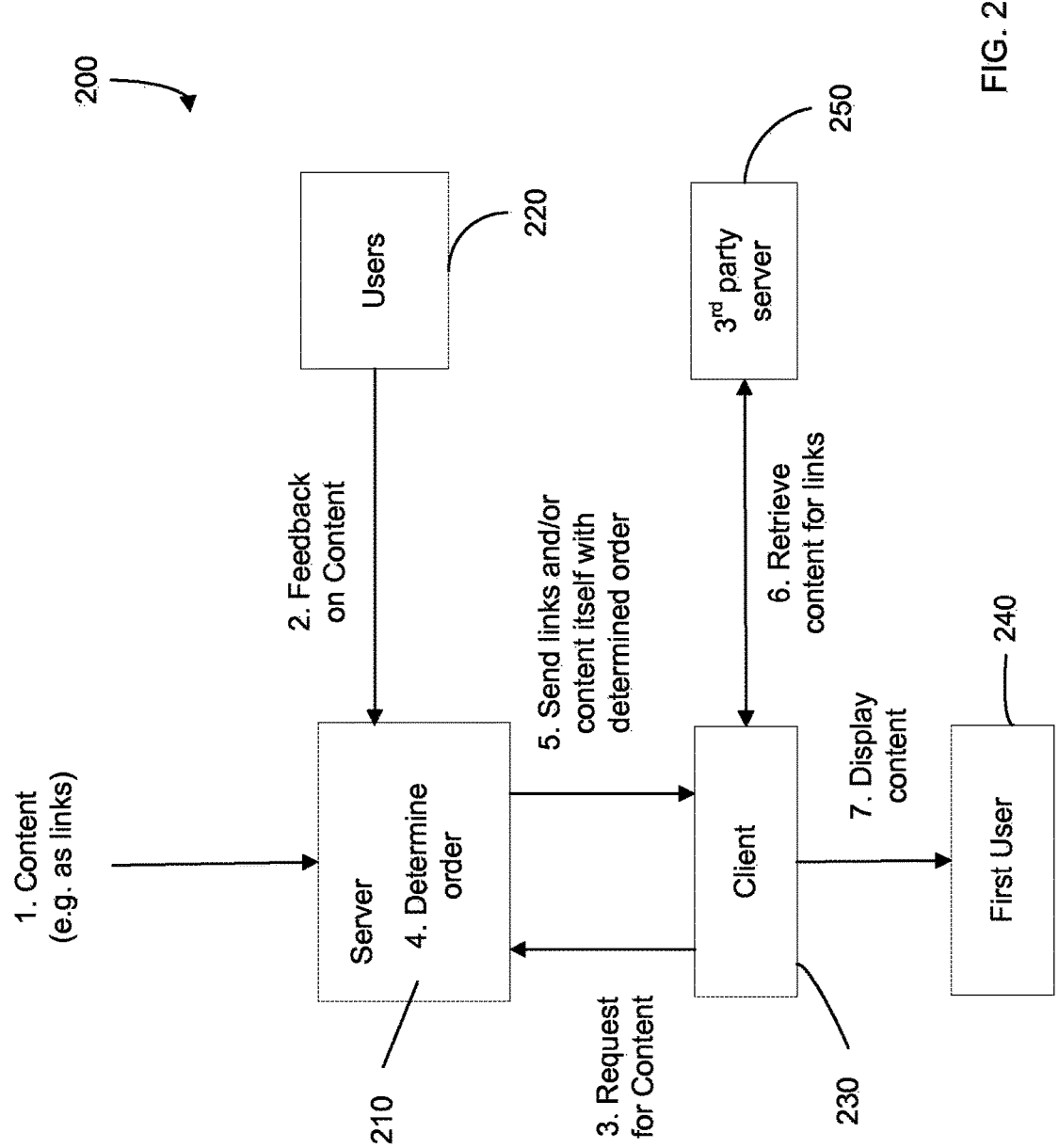
FIG. 2 is a block diagram showing interactions of a content server with clients and users according to embodiments of the present invention.

FIG. 2 is a block diagram showing interactions of a content server with clients and users according to embodiments of the present invention. System 200 includes servers, clients, and users. Server 210 receives content, e.g., as links. The content can be received from any source, including users of server 210 and administrators or owners of server 210. In one embodiment, the server 210 can receive content files and store the content files within a storage device communicably connected with server 210. The server 210 can also create links to the content files and store the links in a list. In another embodiment, server 210 can receive links to content that is stored on servers external from server 210. In yet another embodiment, server 210 can handle any combination of content and links.

Users 220 can send can send feedback to server 210. Users can send feedback via client computing devices, such as handheld devices, smart phones, netbooks, and other devices. In various embodiments, the feedback can be sent directly to server 210, or sent to other servers, which can then relay the feedback to server 210.

A client device 230 being used by a first user 240 can send a request for content to server 210. For example, first user 240 can select an activation object (e.g. a request button), and the client device can send a request in response to actions of the first user 240). In one embodiment, the request can be for a particular channel that is hosted on server 210. The hosting of a channel by server 210 can include storing links to content for the channel and/or storing content files.

In response to a receiving a request for content, server 210 can determine an order of content items that correspond to the request, e.g., the content items of a request channel. In one embodiment, the order of the content items can be based on the feedback from users 220. The content items can then be sent to client 230. In one implementation, the content items are only links, which can be sent as an ordered list. In another implementation, the content items are only content files, which can be obtained via links before sending the content items to the client. The content items can be sent as a stream of content (e.g. video) from server 210 to client 230. In yet another embodiment, a combination of content files and links can be sent with an order specified by the timing of sending of the content items, a data structure of the content items, or by other data specifying the ordering.

When the content includes links, client 230 can request content files corresponding to a link from any server, including a third party server 250 (or even from server 210). Once client 230 has received the content files, client server 230 can then provide the content to the first user 240 (e.g. via a display device and/or speakers). In various embodiments, first user 240 can select links to view or simply sit back and have the content displayed.

Figure 3:
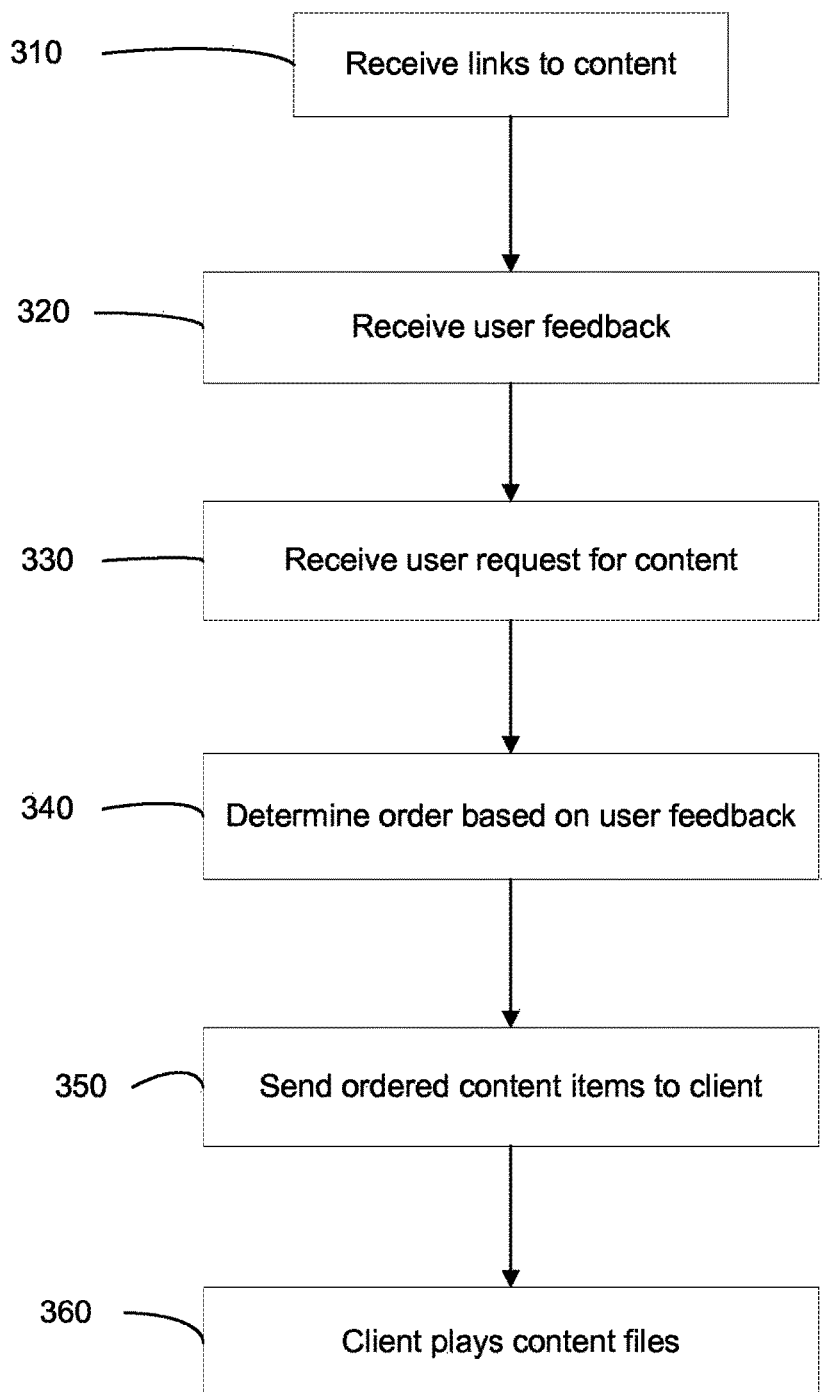
FIG. 3 is a flowchart illustrating a method 300 of providing content to a user according to embodiments of the present invention.

FIG. 3 is a flowchart illustrating a method 300 of providing content to a user according to embodiments of the present invention. In one embodiment, method 300 can be performed entirely or partially by system 200, and respective components of system 200. Any of the methods described herein can be performed entirely or particularly by a computer system, including a processor.

In step 310, a server system receiving links to a plurality of image content files. In one embodiment, the server system is a website, which can have a plurality of users. In one implementation, the links can be sent by users of the server system. In another implementation, the image content files can be provided by the users, and the server system can create links (and thus receive the links) to the image content files that are stored on the server system. Therefore, the server system can still receive links (e.g. form itself) in this implementation, even though the image content file was received from a user.

In step 320, user feedback about the image content files is received. In one embodiment, the user feedback can be received directly from a user, e.g., after a user watches the content of an image content file. In various embodiments, the feedback can be a comment, a rating (a number or letter classification), or a like or dislike response. In another embodiment, the user feedback can be received from another server of a different website, e.g., a web site that stores the content files being viewed.

In step 330, a request from a user for content is received. The request can be received for a particular channel, e.g., as described herein. The request can take various forms. In one embodiment, the request is to view a list of links to the content of a requested channel. In another embodiment, the request is to have the content files of a channel displayed.

In step 340, a computing system determines an ordered list of the links based on the user feedback. In one embodiment, the server system is the computer system that determines the order. In another embodiment, a client device can determine the order. For example, code from the server system can be sent to the client device, where the code directs the client to perform the ordering. The ordering can be performed before or after the user request, and can be performed in response to the user request.

In step 350, the ordered content items are sent to the client. The content items can include links and/or the content files. In one embodiment, links can be sent as an ordered list, e.g., as for display on the client. The ordered links can be displayed to the user for selection by the user. In another embodiment, the links can be sent in groups of one or more to be played at the client, e.g., in a continuous play mode.

In step 360, the client plays the content files. In one embodiment, the user can select individual links from an ordered list of links. In another embodiment, the client plays the next link that is residing in a queue. In one implementation, the client can play the links automatically, e.g., in a continuous play mode.

In various embodiments, the ordering can use how much feedback has been provided by users, a timing of the feedback (e.g. how recent the activity is), how recent a content item was uploaded, how many times the content items has been viewed, or any combinations thereof. Content can also be ordered based on various metrics on the users who originally shared the content. For example, a user might want to see content items (e.g. as a list or in continuous play) from users you're following who have each shared at least 200 pieces of content. Another example is that a user might want to see a stream of items from users that another user is following who each have received at least 20 props (positive indicator), or perhaps they each would need to have a prop to share ratio of at least 2.7.

The exact formula for determining the order can vary. In one embodiment, equal weight is given to a new shared item (content item) as is given to a new comment or prop being posted on an old share with lots of comments or props. In various other embodiments, items are bumped (moved higher on the list by one or more spots, or all the way to the top) only if there are sufficiently many comments or props on them already; items are bumped only if the user has not yet watched the item; items are bumped only if the user hasn't watched the item within a certain amount of time; items are bumped only if the user who posted the new comment or prop is someone the user is following; and items are bumped only if the user who posted the new comment or prop has sufficiently many followers, or has shared sufficiently many items, or has a prop to share ratio of at least some minimum value. Any combination of the above embodiments may be implemented.

Since the ordering may change based on any feedback given by a user, the order of the list of a channel may be constantly changing, as content items move up and down the stream. Additionally, new content items may appear in the list at any time, as uploaded content items can instantly appear in a stream. In some embodiments, the ordered list is refreshed at certain events and/or periodic intervals. For example, every five seconds, a new list could be calculated. In other embodiments, the ordered list is updated immediately when a new action is performed. For example, the list could be refreshed whenever someone uploads, comments, or props content. How links and the content files may be viewed and/or displayed in various embodiments is now described.

III. List Mode

As mentioned above, a list of content items can be provided to the user so that the user can select which image files (e.g. videos) to watch. The videos can be presented in any order. In one embodiment, the content is presented in an order based on user feedback.

Figure 4:
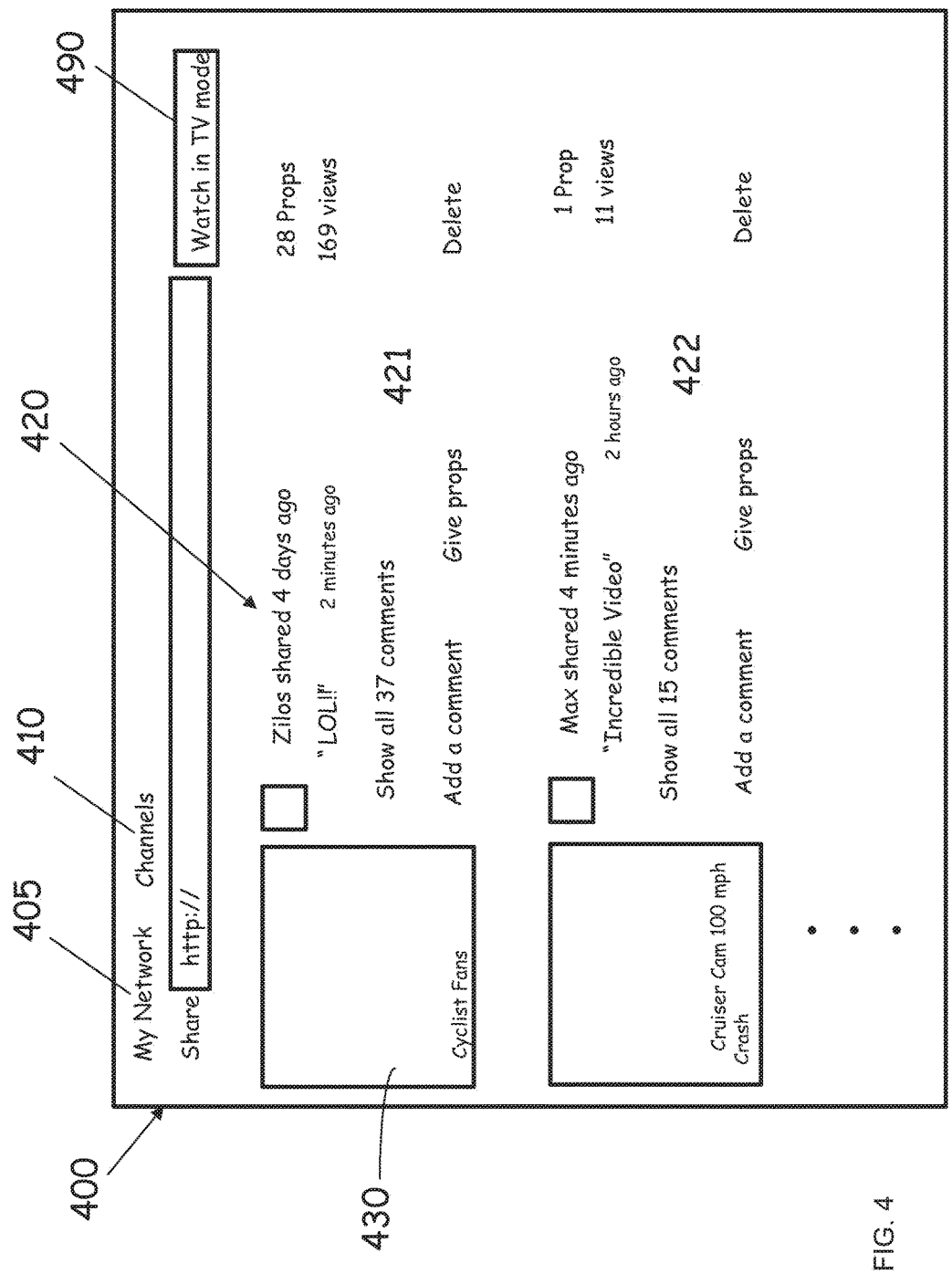
FIG. 4 is an application page (e.g. a web page) showing a listing of content items according to embodiments of the present invention.

FIG. 4 is a web page 400 showing a listing of content items according to embodiments of the present invention. As shown, web page 400 has the My Network channel 405 selected, and the list 420 for this channel is displayed. In one embodiment, channel 405 is a collection of content from users that are being followed by the active user (i.e. the user who is accessing web page 400). Other embodiments can have multiple My Network channels, e.g., different channels for different groups of users being followed. In one implementation, other channels can be accessed with the channel button 410. A listing of channels to browse or search can be provided.

The list 420 can show the different content items in separate panes or boxes. As shown, each content item has a preview window 430 that shows an image from the content item. Comments can also be displayed, e.g., to the right of the preview window. Buttons can be used to add a comment or provide props. A user can also delete a selected content item, or send a link of the content item to a friend. If the content item was shared into a subject-specific channel (e.g. as created by a user), then that title along with an icon can appear signifying what channel(s) the content item has been posted to.

In one embodiment, list 420 has a top, which is signified by a content item 421. List 420 can then provide other content items in a linear fashion below content item 421. The ordering of list 420 can change over time based on how much feedback has been provided by users, when the feedback was provided, how recent the content item was uploaded, how many times the content item has been viewed, or any combinations thereof.

Regarding the ordering, in one embodiment, a number of props and a number of times a content item has been viewed can be used to determine the ordering. Thus, content item 421 can be placed at the top because it has the most props (28) and/or the most views (169). In one implementation, a metric can be based on a sum of these two values, which may be weighted, and the metrics can be sorted to determine the ordering. In another embodiment, how recent activity is for an item can be used. Thus, content item 421 may be at the top because it has had the most recent activity. The last comment was two minutes ago. In yet another embodiment, how recent the content item was shared can be used. Any of the factors mentioned herein can be used exclusively or in combination with other factors (e.g. in a weighted sum). As shown, content item 422 is second even though it was shared more recently. Thus, that factor is not being used or being used in combination with other factors.

In some embodiments, a reordering of list 420 can occur based on new activity on the items. In one embodiment, the order can be completely recalculated. In another embodiment, the order can be modified in a local manner based on the new activity. For instance, a content item can descend in the stream only when another content item is bumped above it. A content item may get bumped up when activity happens to the content item (e.g. comment, view, prop, etc.). As an example: Suppose content item A is just above content item B, and suppose content item B then receives a prop. Content item B will be bumped up toward the top of the stream, which will cause content item A to descend by one. In one implementation, a content item only moves one position per action.

In one embodiment, whether a content item has been viewed by the active user or not is not used as a factor in determining the ordering. In various other embodiments, whether a content item has been viewed by the active user may cause the content item to go to the very bottom of list 420, or to be removed from list 420.

In some embodiments, when a user selects a content item, the content item can open up inline in the page. In one embodiment, when a content item is being played, the list is frozen and updates to the list are not done. Notification of one or more pending updates (e.g. the number 2 can signify two pending updates) can be placed on the page (e.g. at or on top of the display window for the content item). If the notification is selected, the updates can be then processed onto the list. In one embodiment, the list can be made to be frozen until this notification is selected. In other embodiments, the list can updated when the content item has finished playing, the user stops the content, or the clicks on another part of the screen.

In various embodiments, a new list can be pushed to the user immediately, or the user (or client without knowledge of the user) can poll the server. In one embodiment, the server can be polled periodically (e.g. every 10 seconds) for new list information (e.g., new items and a new ordering) for displaying a new list. In an embodiment when a client polls a server for updates, the client can send the server a piece of information that tells the server the most up-to-date piece of content that the client is aware of The server can then uses this to construct the difference between what the client currently has and what it should have. The client can then uses these "cliffs" to augment its list of items to match what it should have.

IV. TV Mode (Continuous Playback)

In another embodiment, the user does not need to select each content item to watch.

Instead, the user can select a channel and have the content displayed in succession. The order for the playback can be the same as the order of the list, which can be determined based on factors mentioned herein. Thus, unlike broadcast TV, where a studio executive "programs" content in channels, "TV mode" can use other viewers to determine what content should play.

Figure 5:
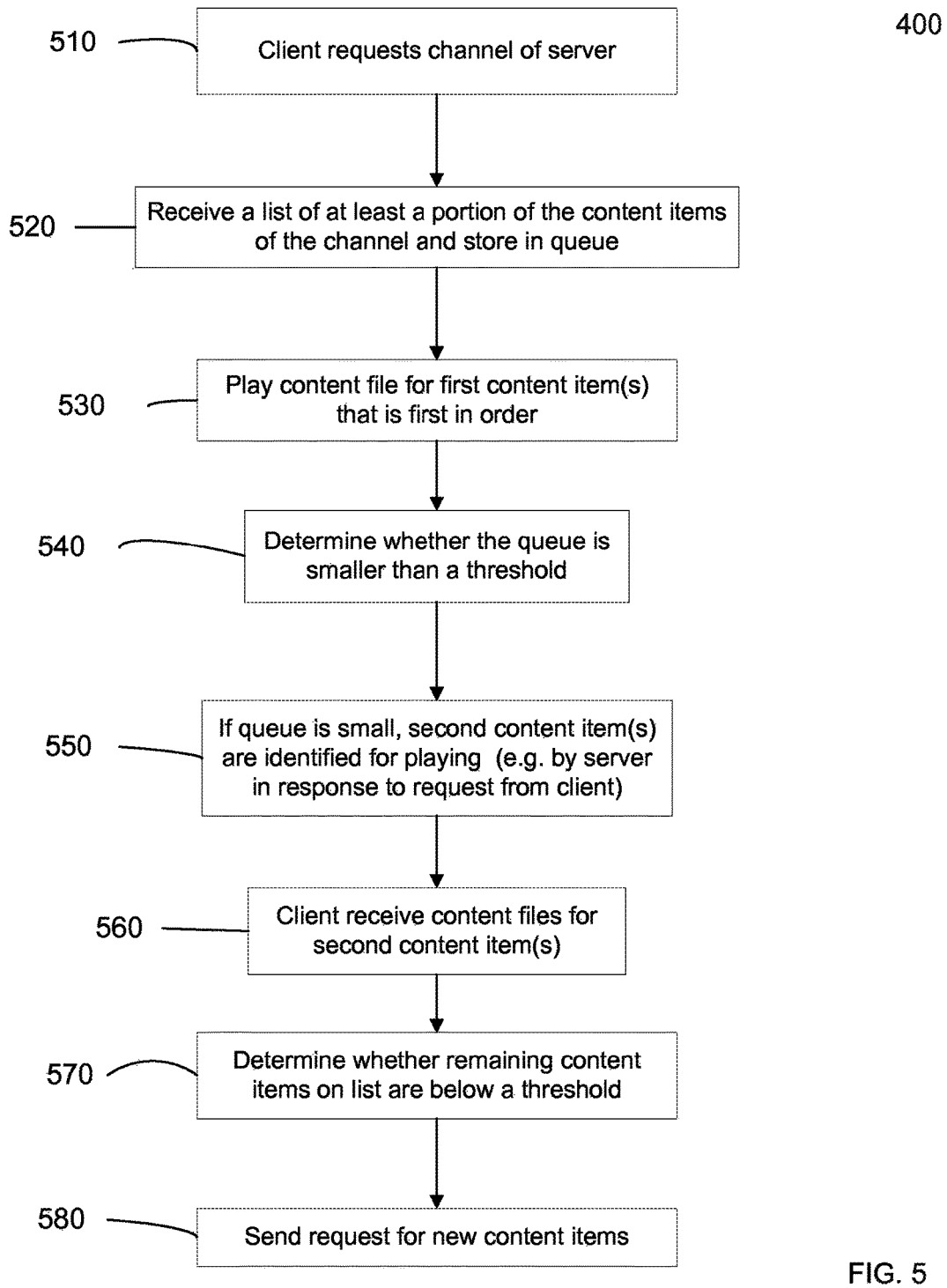
FIG. 5 is a flowchart of a method 500 for providing automatic playback of content items according to embodiments of the present invention.

FIG. 5 is a flowchart of a method 500 for providing automatic playback of content items according to embodiments of the present invention. The playback can be continuous in the sense that a user does not need to select a next content file to view. Some embodiments can still have a pause, forward, or back button to control playback of content and to skip ahead to a next item or return to an item already played. Certain steps may be optional and performed in a different order. For example, a queue of links can just be analyzed, as opposed to analyzing a queue of content files.

Method 500 can be implemented in various ways. In one example, a relatively small amount of content item(s) can be sent by the server to the client, and then the client can request another content item(s) when the amount of content on the client is running low. The new content items can be the next items on an ordered list, calculated at the time of the request. In another example, the client can have many content items, order the content items, retrieve content files for the content items when content is running low, and when the content items are running low request more content items.

In step 510, a client requests a channel of content from a server. The request can be made as described herein, and a channel can be browsed or searched to find the desired channel. For example, a user of the client may initiate the request. In one embodiment, upon initiation of TV mode for a channel, a client running the TV mode (e.g. a browser running the TV mode) can request one or more content items (e.g. 2) at the top of a given list of content items for a channel, receives the item, and starts playback. As other example, a client running the TV mode can include any device that can play video and access the servers. For instance, this could include internet enabled TVs, set-top boxes, gaming consoles, etc.

In step 520, at least a portion of the content items of the channel are received from the server. The content items can be received with a particular order, or information to obtain the order. In various embodiments, the content items may be received as an ordered list of links, as a stream of content files, or as a combination. In one embodiment, the portion received is the content items that are ordered to be first in the channel. In one implementation, any of the orderings may be particular to the requesting user. Thus, a channel may be ordered differently depending on the identity of the requesting user.

In one embodiment, the client may receive a link at a top of a list (e.g. an ordered list), and the client can retrieve the content file referred to by the link. The content files received from the server or retrieved from other servers can be put into a queue (backlog). If content files are received directly from the server (potentially along with links), these content files can be put into a queue as well. The queue can be stored in any local memory to the client computing system. In another embodiment, the client can perform an ordering of the content items received.

In step 530, the client plays a content file for a content item that is first in order (e.g. highest prioritization). In one embodiment, the played content file can be first in the queue. In another embodiment, information from the server can designate which content item is first in order.

In step 540, the client determines whether the queue is smaller than a first threshold (queue threshold). In one embodiment, immediately after starting to play the first content item, TV mode (e.g. a web browser running on the client device of a user) can request a next item (e.g. item 3 if 2 items have already been retrieved) from a server of the website. In other embodiments, the request can be made at any number of items in advance. Thus, the queue can drop to zero items, or the queue can be made to have any number of items or length of playback.

In step 550, when the queue is smaller than the threshold, a second set of one or more content items to be played following the first set of content items is identified. For example, once the amount of content files in the queue is small, the client can obtain one or more links that are next in the list and retrieve the content files for those links. In one embodiment, the second set of content items can be identified by the client from the list of content items provided previously. For example, the second set of content items can be identified from an ordered list that was created by the client previously, or in response to the queue being small.

In another embodiment, the server can determine a next item(s) to send to the client device, e.g. in response to a request by the client after determining that the queue is small. In one aspect, the server may have determined a new order of the list (e.g. either as a periodic step or in response to a request) since the last item was sent. Thus, a client running TV mode can pull one or more of the next content items in the given stream, and "queue" them for playback. After video playback of the first video is finished, it can immediately start playing the next queued content item. In one embodiment, advertisements can be played between content items. In another embodiment, if a next item is not yet available, then an interstitial window (e.g. a logo, black screen, or some other default screen) can be displayed.

In step 560, the client can receive content files for the second content item(s). In one embodiment, a web browser running on the user's computer performs at least one part of the retrieving (e.g. requesting). In one implementation, the retrieving may occur by the web browser requesting a next content item from the server of the web site. Using a link that is stored at the server, the server may then retrieve the content item from another website or from its own storage and send it to the web browser. In another implementation, the web browser may request the next link, receive the link, and then retrieve the next content file using the link.

If multiple content items are retrieved, a next retrieval can occur after several of the retrieved content items have been played. In one embodiment, the number of content items retrieved can depend on the amount of playback time of the items. For example, if the next item is 5 minutes, then only that item may be retrieved. However, if the next few items are 5 seconds, 8 seconds, and 6 seconds, all of them may be retrieved at once. If the content is a single picture or a collection pictures, the playback can have settings (with a default, e.g., 3 seconds) for how long a picture is displayed. This setting may be used to determine the playback time of a picture.

In step 570, it is determined whether remaining content items on list are below a second threshold (content item threshold). In one embodiment, step 560 is an optional step performed when the client performs an ordering of a relatively long list of content items. In various embodiments, the determination can be based on the number of content item as a percentage or absolute number, or as the amount of run time for the remaining content items.

In step 580, if the amount of content items is below the second threshold, a request for new content items can be sent to the server. The server can determine new content items to send. The new items can be based on new user feedback. In one embodiment, the request for more content items can include the content items that have already been viewed. In this manner, the server can determine which content items to send without duplicating any items that have been previously played.

In one embodiment, step 540 may use the criteria of the number of content items (potentially being just links), as opposed to an amount of content files only. Thus, effectively steps 540 and 550 can be replaced with steps 570 and 580.

Figure 6:
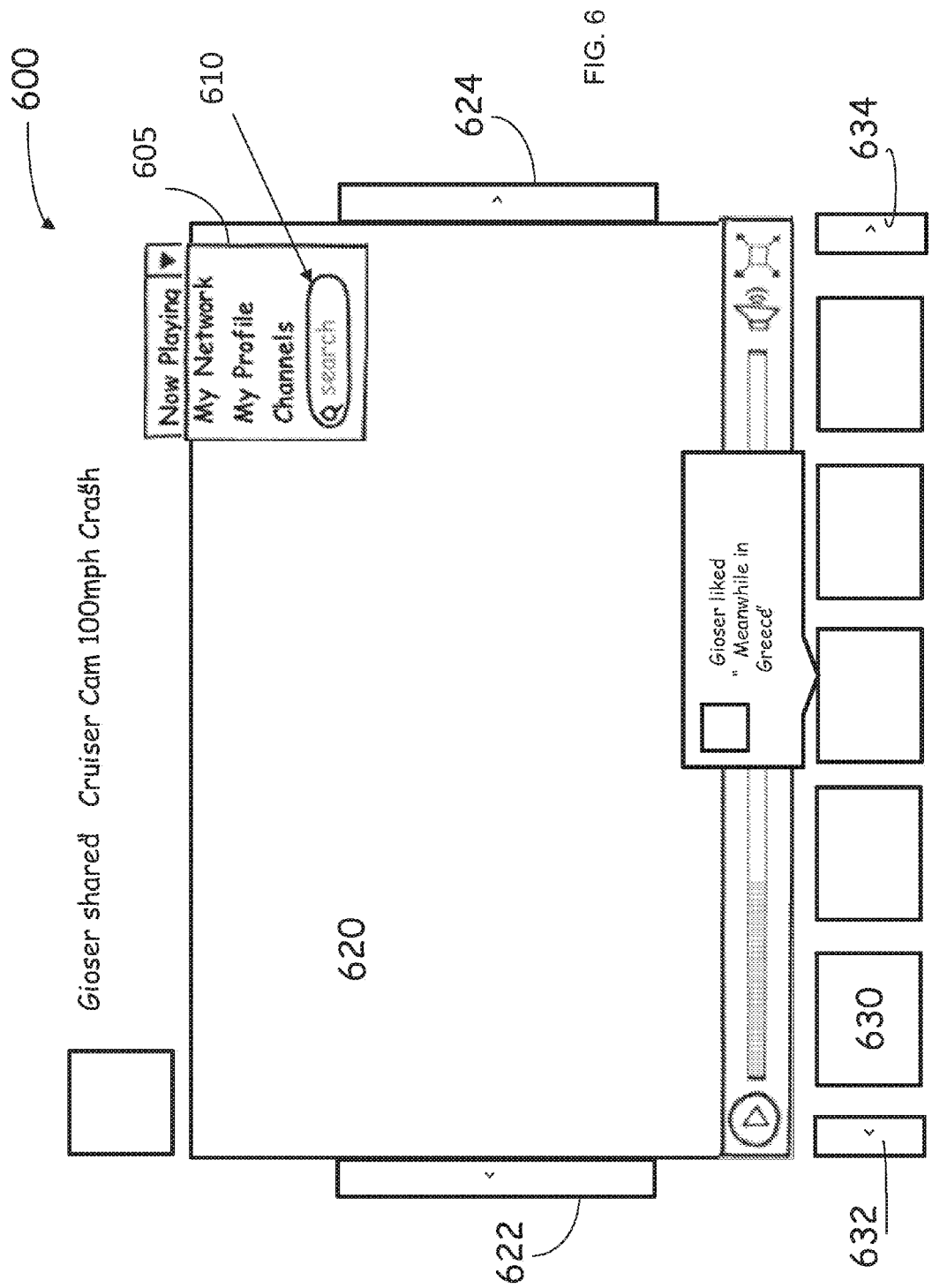
FIG. 6 is a application page 600 showing a display of continuous playback (TV mode) of content items of a channel according to embodiments of the present invention.

FIG. 6 is a web page 600 showing a display of continuous playback (TV mode) of content items of a channel according to embodiments of the present invention. In one embodiment, image content can be played in a screen 620. Different channels can be accessed from a menu 605, which can include a search feature 610. In one aspect, options can vary from "everyone" to "my network", to specific topic-based channels. In one embodiment, playback may start with the selection of the channel. In another embodiment, continuous playback can start by selection of a button, tab, or other object that is displayed on the screen. For example, tab 490 of FIG. 4 may be selected to begin playing the list 420 in TV mode. Embodiments can also enable users to select a specific stream. For example, menu 605 can let the user watch the 'everyone', 'my network', 'popular', and 'my profile' instantly, but also includes a menu that lets a user browse channels (which function as topic-specific streams).

In various embodiments, controls can enable the user to pause or play the currently playing video, as well as advance (control 622) and go back (control 624) to other videos in the stream. In one embodiment, preview images 630 of videos that will stream next can be provided. The order of the preview images 630 can correspond to the ordered list of content items that is being used to create the continuous playback. In one implementation, a user can scroll through the preview images 630 using forward and backward buttons 632 and 634. In one aspect, scrolling through the preview images 630 does not affect the playback of the current content. A history of videos a user has watched can be stored persistently on the client so that users can go back to previously watched items. In one embodiment, the history is sent back to the server so that videos are not repeated (unless a user hits the back button).

As mentioned above, in one embodiment, the list can be ordered based on user feedback, e.g., ordered by recency of activity on each link item. For example, the first item has the most recent action, the second item has the second most recent action, and so on. In other embodiments, other factors such as the total amount of activity can also be used. Some embodiments can combine some or all factors mentioned herein.

Two examples of types of activity that can happen to an item: either a user can comment on an item or "prop" an item (an expression of approval or like on the item). In one embodiment, either propping or commenting an item will cause it to be "bumped up" (e.g. by one or more spots) or immediately have it appear at the top of the stream. In another embodiment, a comment can be determined as being negative or a specific negative indicator (e.g. an inverse of props) can be used to push a content item down the stream. In yet another embodiment, the number of times that link has been posted can be used to determine a single position in the list for a content item. As an alternative, a new share (content item) appears at the top of the stream, even if there are previously-existing shares of the same link (which can be located at different points in the list).

In one embodiment, after a video has been played, it is placed at the bottom of the stream for the user who is watching the channel. In another embodiment, after a video has been played, a pointer is moved down the list. Effectively, the pointer acts as the top of the list. In yet another embodiment, the next video that is queued is the highest ranked item, which has not been viewed already. In this manner, a pointer is not necessary nor is the movement of a video that has already been watched. Also, the stream can be the same for everyone, but the items that have been watched for a particular user is tracked instead.

In one embodiment, each time a content item finishes playing, a next content can be put into the queue. The order of the list may be recalculated each time a new content item is placed in the queue. This process can continue until TV mode reaches the last video in the stream, and then TV mode can start at the top of the stream again. In one embodiment, if a video has already been played in TV mode, but then receives subsequent actions (such as props or comments) that bubble it back up to the top of the stream (or to the pointer marking the effective top of the stream that is being played), that video is not displayed in TV mode until all other unique videos in the stream have been played in TV mode. This can ensure that popular videos with a lot of activity will not repeat in TV mode. Embodiments providing this functionality are described later. In another embodiment, the next video can be queued as soon as the current one starts playing, and the backend is polled for new comments on the current video every 3 seconds.

In one embodiment, while content is playing, user activity (comments and props) can be overlaid at the bottom of the video. A username and/or avatar of the user who made the activity can also be displayed. In one aspect, one piece of user activity can be displayed at a time, and is cycled through in the overlay. In one aspect, the comments and props can continue when playback is paused. A counter (e.g. 5 out of 14) can be displayed, which shows the number of the comment that is currently being displayed.

In another embodiment, a couple seconds into video playback, an overlay can fade in (e.g. at the top of TV mode) with the username and avatar of the user who shared the item. This overlay can fade out after 10-15 seconds. About 30 seconds into video playback another overlay can fade in (e.g. at the top of the video surface) and display a thumbnail and title of the item that will play next in TV mode. In yet another embodiment, overlays can appear that recommend other channels or videos the user should click on to play.

In one embodiment, on an internet TV (including a TV with external devices added to the TV), the TV can have some code downloaded to enable channels from a particular server. This code can then retrieve additional code that can perform ordering, or that can function to request more content when the amount of content in a queue (backlog) is low. Other examples besides a browser displaying running code from a website include client applications written for a variety of mobile devices, set-top boxes, and other devices.

Figure 7:
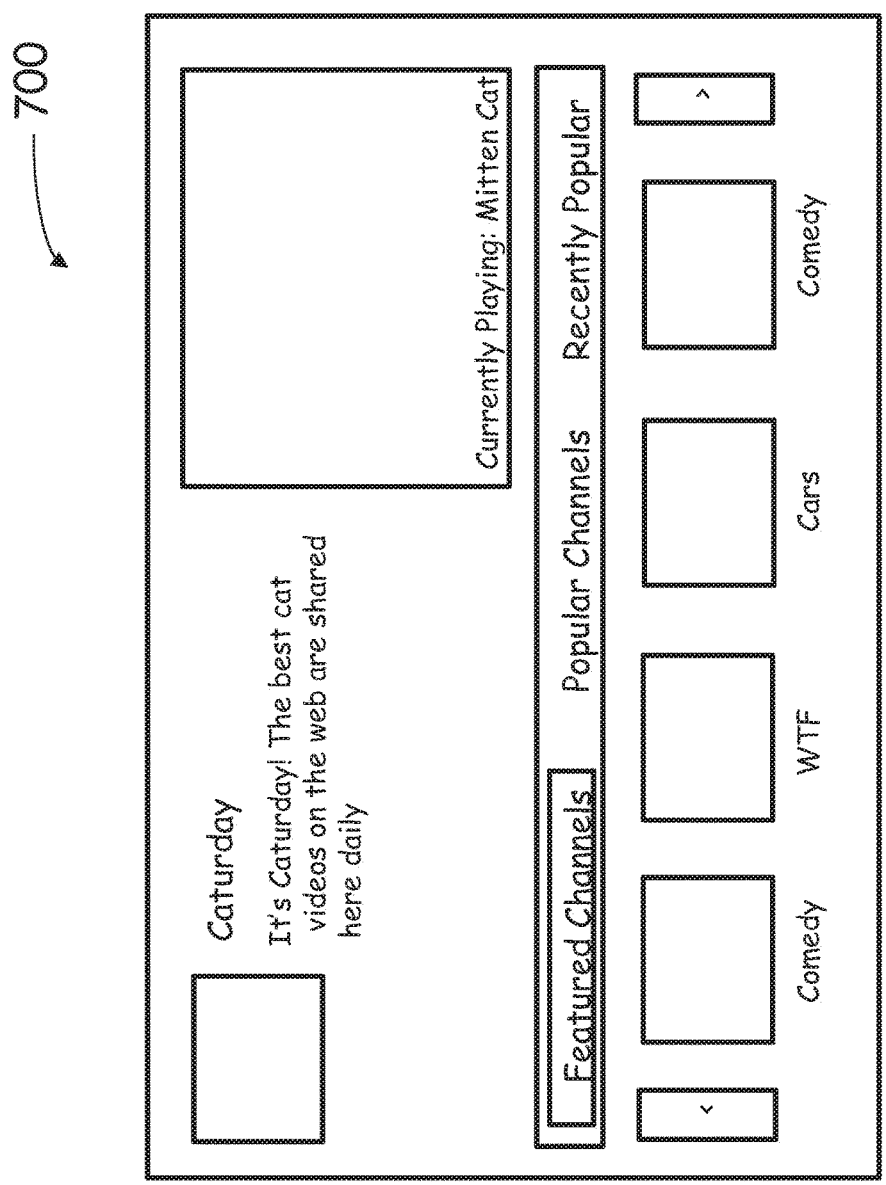
FIG. 7 shows a page 700 with a menu that results from selecting the channels button, thereby allowing other channels to be accessed according to embodiments of the present invention.

FIG. 7 shows a page 700 with a menu that results from selecting the channels button, thereby allowing other channels to be accessed according to embodiments of the present invention. In one embodiment, a button may be used to send the TV mode to a random channel. In other embodiments, a button can send a user to a random video, or to a piece of content or channel that is recommended based on a variety of metrics.

Users can take action on content they see in TV mode by either giving props to the item or leaving comments. For example, a user can leave a comment by clicking a button on a side of the screen. When the button is pushed, a box can overlay on top of the content for the comment to be provided, along with a submit button. A user can also send the link to someone, e.g. by instant messaging including SMS or MMS, social network, blogging, microblogging, or by e-mail. Neither action affects playback, and upon submission, actions are inserted instantly in the area that displays actions on the items.

V. Avoiding Duplicates

One problem in fetching new videos in TV mode is that of duplicates. Suppose a user views video A, then video B, but while he is viewing video B, video A is acted on again, which brings video A to the top of the list. Then, when the next video is retrieved, the video with the most recent activity is A (or otherwise at the top of the list), and the user sees it again, which makes for a poor experience.

In order to avoid the problem of duplicates, certain embodiments can implement the following approach. The client can keep a cache of recently viewed content items (e.g. using a Flash SharedObject, sometimes referred to as a "Flash cookie"). When the client requests the next video (e.g. as a link or the file itself) from the server, the client can additionally send back the contents of the cache (e.g. in one embodiment of step 550), and the server skips over videos already in the cache. The content of the cache may be stored as unique identifiers of the links, the links themselves, or some other suitable identifier. In other embodiments, the recently viewed items can be stored in files on the client's disk, browser cookies, or in HTML5 client storage, or other local storage mechanisms. In another embodiment, the server can also keep track of the list of recently viewed items, e.g., by tracking the items sent from the client. This list of recently viewed items can be stored in cache at the server, or in some other memory. In one aspect, the recently viewed items on the server can be used in case the user clears the cache on the client.

In one embodiment, two content items can be identified as not being unique, and then the second content item will not be played in a given cycle after the first instance of the content item has been played. In this manner, a person will not see a same piece of image content twice even if the image content has been posted twice. In another embodiment, if the cache includes all of the videos in the stream from which a new video (or any other content file) is being requested, the server can ignore the cache and selects the most recently acted upon video. In this case, the server can additionally pass a flag to the client instructing it to clear the cache.

In other embodiments, a counter can be associated with each content item, and the counter can be used to determine whether a content item has already been played. In one embodiment, the counter can be simply 0 or 1. For example, a 1 can signify that an item has already been viewed in a given cycle of the list. At the end of a cycle, the counters can be reset.

VI. Updating A User'S Network Channel

A first user can create one or more customized network channels as an aggregation of the channels of certain users (e.g. those being followed) and of subject-specific channels. A technical challenge for determining content of such a network channel is updating such a network channel when someone makes an action on the site. As a user may be following many people on a network channel, the channel may be updated often. Also, since many people may be following a certain user, if the user makes an action, then many users' network channels would need to be updated, which can be computationally expensive. Also, there can be problems in synchronizing the channels to ensure that a user is seeing a true combination of the individual channels of the users that the he/she is following.

One approach can be to store a view (ordered list of the content items) of all the network channels of each user, where the channels of the followed users and subject-specific channel can be referred to as subchannels of the network channel. When an action occurs in a subchannel, then each of the network channels following that subchannel would need to be updated. A difficulty with this approach is that it requires a relatively large number of database writes, which are expensive.

In other embodiments, such a view for each user is not stored, but is generated anew every time a request is made concerning a network channel. As an example, a request could be made when a next content item (link or file) is requested by the client from a server for displaying to the user. This request could be made every time that a new item is to be displayed, and thus a next content item would always be ready for displaying.

Generating the view of a network channel could require hundreds of database reads, depending on how many people and channels the user is following. In one embodiment providing the real-time updates, a view can be typically generated about once every ten seconds when the user is viewing his or her network channel. To make this feasible, some embodiments store certain channel data in a distributed series of local memory that can be accessed by any servers of the website (called memcache) or other local memory, such as other cache or RAM (i.e. not a hard disk), which can be read from very quickly.

Figure 8:
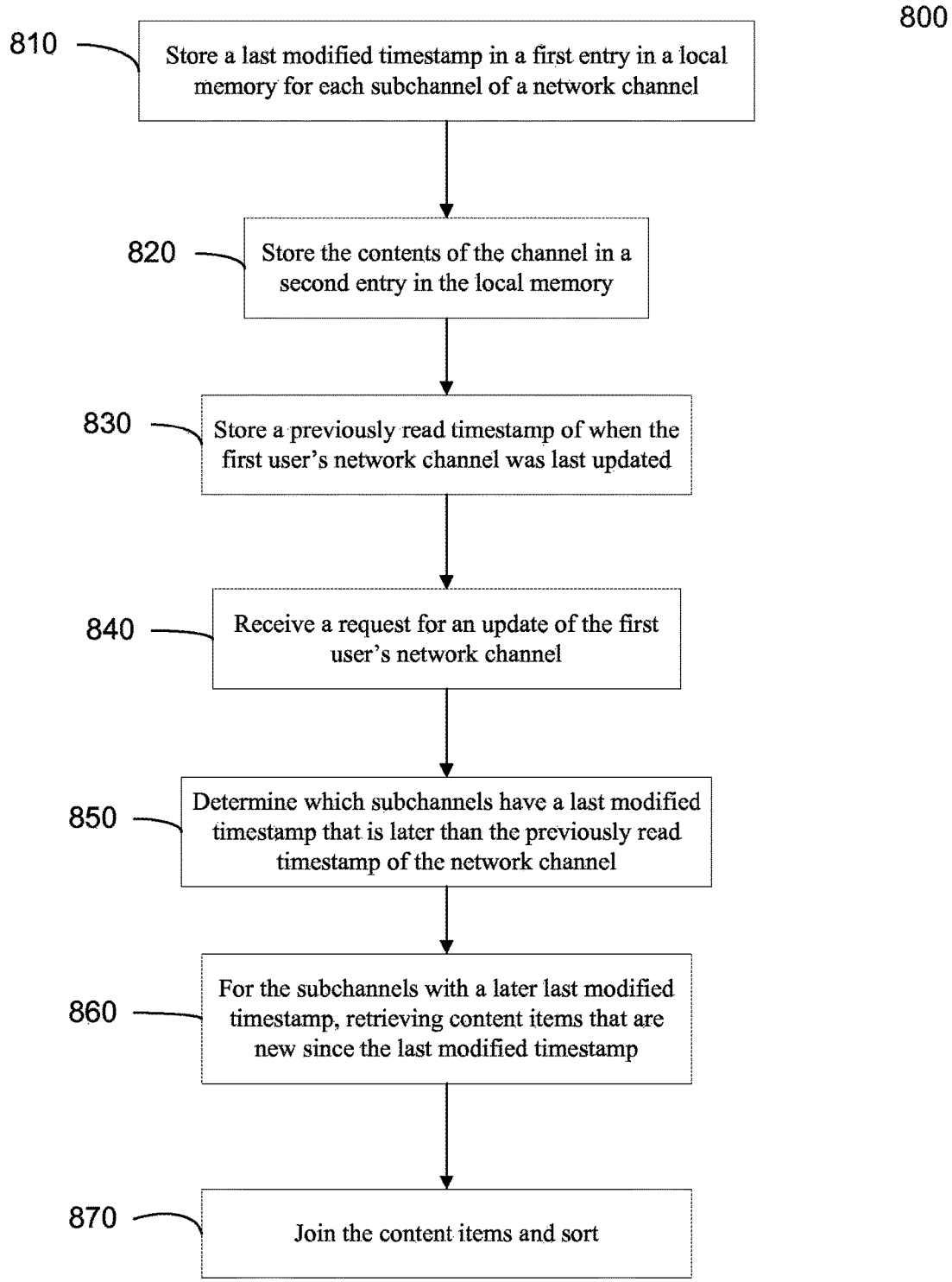
FIG. 8 is a flowchart of a method for tracking and determining a network channel according to embodiments of the present invention.

FIG. 8 is a flowchart of a method for tracking and determining a network channel according to embodiments of the present invention. Method 800 can be performed entirely or partially by a server system, as described herein.

In step 810, a last modified timestamp is stored in a first entry in a local memory for each subchannel that a first user is following in the first user's network channel. In one embodiment, when an action occurs on any of the subchannels (e.g. a channel attached to a user being followed), only that user's channel is updated and not the network channel of every user that is following that user. In another embodiment, the local memory is memcache.

In step 820, the content items of a respective subchannel are stored in a second entry in the local memory. This can be done for each subchannel that makes up the network channel.

The local memory can be the same or different for some or all of the subchannels. In one embodiment, the contents entry can have a list of the IDs for each share item present in the subchannel, and the time that each share was last updated by a comment or prop. The subchannel timestamp entry can be simply the timestamp of the most recent update of any share item in the subchannel.

In step 830, a previously read timestamp of when the first user's network channel was last updated can be stored. In one embodiment, when the first user first views his/her network stream, the content data for each user and channel he or she is following can be read from memory. In one aspect, any missing entries can be filled from the database. In one embodiment, to know which entries are missing, there can be a set of memory entries (e.g. entries in 810 and 820) for each user and channel the first user is following. In one implementation, when a collection of entries are requested from memory, missing ones will not be present in the response. The content can then joined together, sorted, and duplicate items can removed, thereby providing content items for the user's network channel. A time stamp for when this view of the network stream was determined can be stored.

In one embodiment using memcache, the content memcache entries for each other user and channel the user is following is fetched. For any entries missing from the memcache response (those that were not previously cached), fetch the data from the database and add these entries to memcache. The fetched content entries can be joined together into a single set, removing any duplicate share items. The results can be sorted by the timestamp stored for each share item, and present these share items in order to the user.

In step 840, a request for an update of the first user's network channel is received. In one embodiment, an update can be requested when a user clicks on the "network channel." In another embodiment, an update request can occur while the user is watching the network channel. For example, the update can occur when the user's client is running low on content files or links, and more content items are requested.

In step 850, it is determined which subchannels have a last modified timestamp that is later than the previously read timestamp of the network channel. In one embodiment, the timestamp entries for each subchannel can be retrieved. Any entries missing from the local memory response (e.g. those that were not previously cached), the data can be retrieved from the database and added to entries in the local memory.

In step 860, for the subchannels with a later last modified timestamp, content items that are new since the last modified timestamp are retrieved. In one embodiment, for any fetched timestamp that is more recent than the timestamp for a particular subchannel from the previous update or initial view, the list of update items for that subchannel since the previous timestamp can be fetched from the database. In various embodiments, there can be an update item for each new comment, prop, or share.

In step 870, the content items from the various subchannels can be joined and sorted to provide an ordered list for the network channel. In one embodiment, the join is performed by obtaining update lists for each subchannel. The update lists can have just the data for content items that have been updated. This data can then be joined into an existing ordered list of the network channel from the last time it was viewed. Duplicates can be removed at this time. The sorting can be done by timestamps. The content items can be returned to the client device (e.g. in a web browser) as list or in a continuous playback.

In one embodiment, when an asynchronous update (e.g. in the stream view) is to be made, the last modified timestamps for each followed user and channel are read from memory (e.g. memcache). For each followed user and channel, if the stamp is more recent than the previously read stamp, the content data is retrieved and any updates since the old stamp are sent on to the client. If the time stamp is not more recent, then nothing needs to be done for that channel.

Note that in one embodiment changes to a person's network stream is not updated (or at least determined) until the user makes a request for a content item. This embodiment may be used for any channel that is a composite of other channels, e.g., as the network channel is a composite of individual channels. Additionally a channel that is composed of search results for a particular set of terms can function in a similar manner to a network channel. A search channel is a composite of the item streams for each item that matches the search terms. Search channels can use the same methods described above for the network channels.

VII. Multiple Servers

Some embodiments can have a server providing support to another server. For example, a user may be a subscriber to a first website server, which can be supported by a content server that enables an ordering of content from the first website server.

Figure 9:
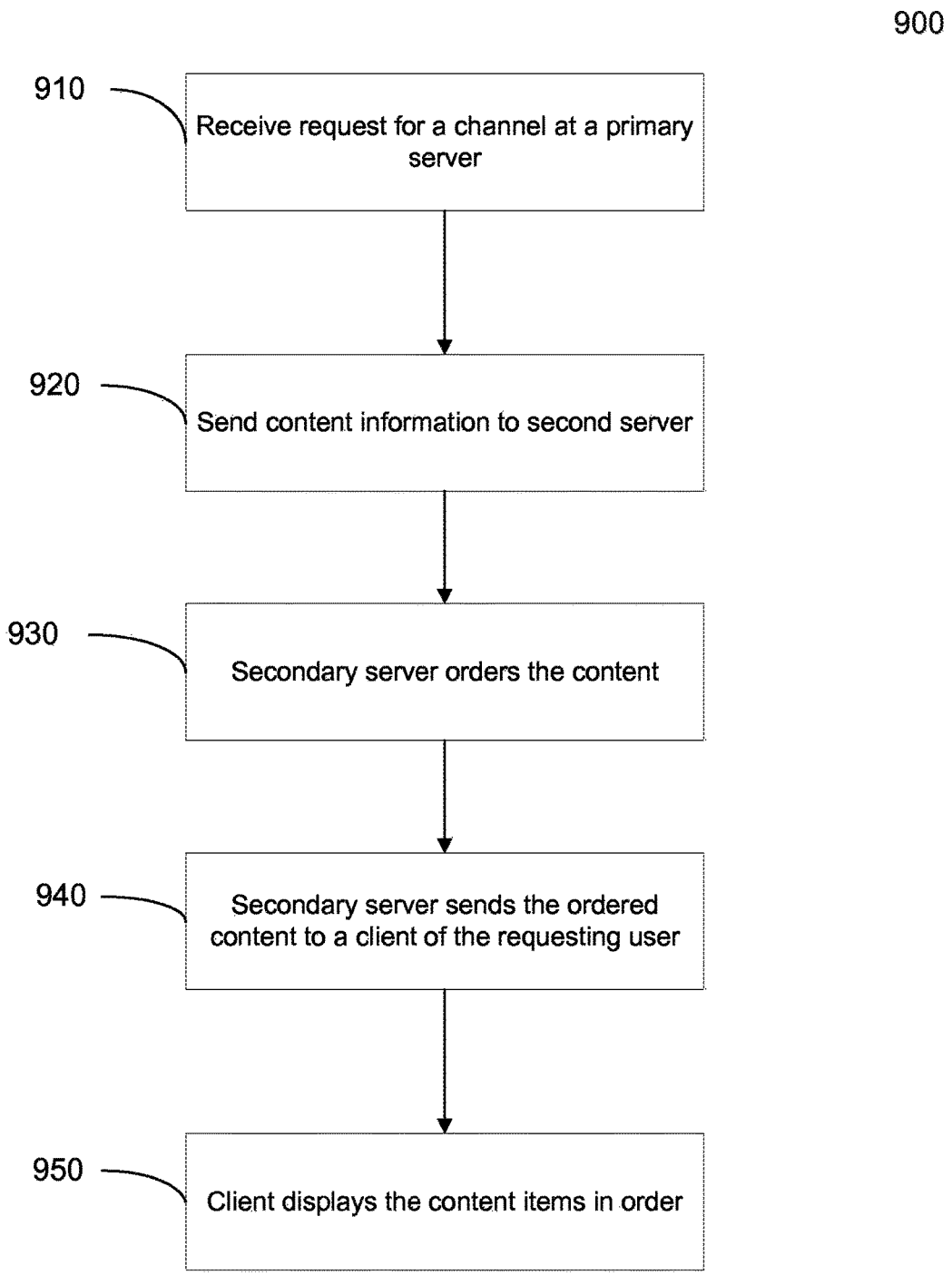
FIG. 9 is a flowchart of a method 900 for providing an ordered list of content items to a user according to embodiments of the present invention.

FIG. 9 is a flowchart of a method 900 for providing an ordered list of content items to a user according to embodiments of the present invention. In step 910, a primary server receives a request for content from a user. In one embodiment, the request can be for content from a particular channel.

In step 920, the primary server sends content information to a second server. In various embodiments, the content information can include channel information (e.g. an identifier that identifies the channel selected on the primary server), links to content files, the content files themselves, and/or feedback on respective content items. In another embodiment, the content information is metadata that conveys information (e.g. a channel identifier) about the request to the secondary server. In one implementation, secondary server is an independent server from the primary server in that separate (potentially mutually exclusive) applications (such as websites) are running on the two servers.

In step 930, the secondary server orders the content items of the requested channel. The ordering can be performed according to any of the embodiments described herein. In one embodiment, the secondary server can add additional content to the content received from the primary server. For example, content items (e.g. links) stored on the secondary server can be added. In one implementation, these additional links can be to content that is popular or content that is related to the content of a channel requested from the primary server.

In step 940, the secondary server sends the ordered content items to a client of the requesting user. In one embodiment, the content items can be sent in groups of content items (e.g. 1, 2 or 3) when the client requests new content items. A request for new content items can be sent through the primary server or directly to the secondary server, e.g., as in embodiments described above. The secondary server can perform a new ordering between each request.

In step 950, the client can display the content items in the order received. The order may be specified by the specific timing of transmission or by metadata accompanying the content items. In various embodiments, the content can be retrieved from the primary server, secondary server, or a third party server. Updates to the order can be performed as described herein.

Figure 10:
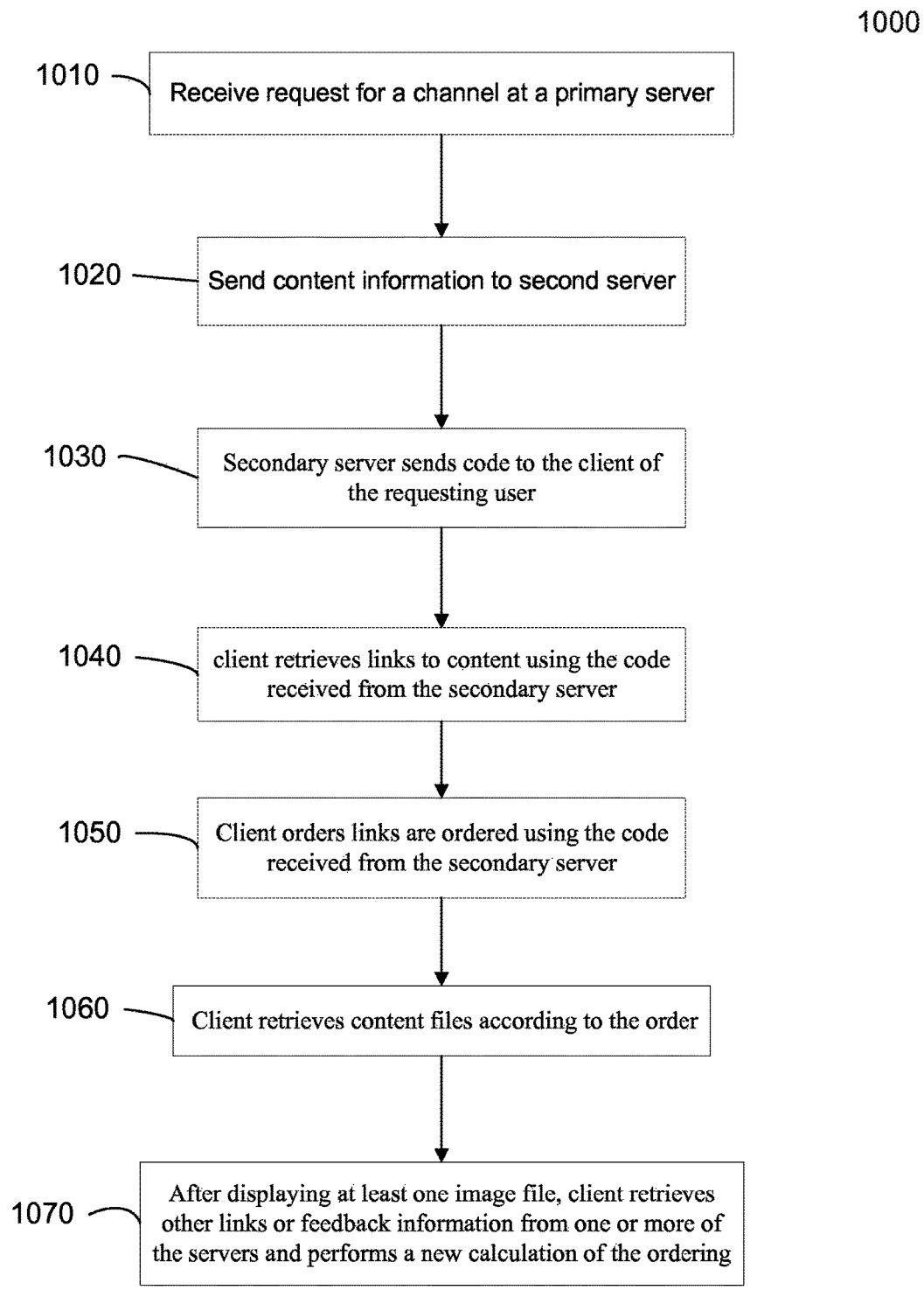
FIG. 10 is a flowchart of a method 1000 for providing an ordered list of content items to a user according to embodiments of the present invention.

FIG. 10 is a flowchart of a method 1000 for providing an ordered list of content items to a user according to embodiments of the present invention. In step 1010, a primary server receives a request for content from a user. In one embodiment, the request can be for content from a particular channel.

In step 1020, the primary server sends content information to a secondary server. In various embodiments, the content information can include channel information (e.g. an identifier that identifies the channel selected on the primary server), links to content, the content itself, and/or feedback on respective content. In another embodiment, the content information is a collective identifier of the channel, e.g., which the primary server can interpret. Content information can also include data about the user who shared a content item, as well as any reply about a content item from a user of the primary server.

In step 1030, the secondary server sends code to the client of the requesting user. In one embodiment, the code runs in Flash. In other embodiments, the code runs in java, javascript, or other suitable programming languages. In one implementation, the code can be sent through the primary server. In another implementation, the primary server can provide information about the client (e.g. an address, a session value, port, inline frame, etc.) so that the secondary server can send the code directly to the client.

In step 1040, the client retrieves links to content using the code received from the secondary server. In one embodiment, the links can be for the selected channel on the primary server, as well as links from the secondary server. In another embodiment, the links can be from other servers that are identified as having a particular collection of content and/or links to the content, e.g. from servers that the user also subscribes.

As to content that can be included besides the content of the selected channel, one embodiment can add links from globally popular content. The globally popularity can be determined as to content on the secondary server, the primary server, or a combination of both. In another embodiment, content from friends of a particular user (e.g. the user whose channel was requested) can be added. Content from friends of friends (and so on) could also be added.

In step 1050, the links are ordered by the client using the code received from the secondary server. In one embodiment, this ordering uses information about feedback from users about the content referenced by the links. The client can retrieve the feedback information as well from the primary and/or secondary servers.

In one embodiment, the requesting user's interactions with the content can be used to determine an ordering of content item. For example, the user's interactions can include which content is played in its entirety, which content is given a prop, or other interactions. The reordering can cause a display of content that the user will like more. In one implementation, this user feedback can be obtained at the client, and thus the reordering can be obtained without any data from any sources external to the client.

In step 1060, the client can then retrieve the content files according to the determined order. For example, the client can retrieve content files as described above for method 500.

In step 1070, after playing at least one content file, the client retrieves other link or feedback information from the servers and performs a new calculation of the ordering. In one implementation, the new links can be retrieved at a time when the number of links is below a threshold, e.g., as described above for method 500. In one embodiment, the new ordering can include information about duplicates. In another embodiment, the calculation can be performed after a certain amount of time or after playing a certain number of image files. Other embodiments described herein can also perform the ordering on the client.

In one embodiment, content from the selected channel can be displayed with higher priority (e.g. first) than other content. As the content from the selected channel is exhausted, or otherwise deemed having a lower priority than other content (e.g. based on the popularity of other content or based on the viewing selections of the user), then the content outside of the selected channel can be added. In various implementations, the exhaustion of the selected channel can be when a specified number of content files of the channel have not been viewed or when a certain percentage of content filed have not been viewed. The exact criteria can depend on the server, and how fast that server (e.g. the next server) can provide content (and if multiple files can be provided at the same time) in order to keep a sufficient backlog (queue) of content available to the user. If a server can provide content faster, then a large backlog is not needed and the retrieval of more links for ordering (and thus the final retrieval of the content files) can be postponed until later.

In one embodiment, there can be first criteria for when more links are obtained and then a new ordering performed, and another second criteria for looking at where the content for the next set of links will come from. The second criteria can be used to maintain a backlog of content files, whereas the first criteria can be used to maintain a backlog of links for ordering into a list. The desired backlog for content can be measured by an amount of time left in the content, and/or by the number of files. Such embodiments are also described with respect to method 500.

When content of a selected channel has reached a reduced stage (e.g., as determined above), other links can be obtained and ordered to determine the next content to view. The other content files can be displayed at the end of the content from the selected channel, or can be interspersed based on an ordering scheme that can put the other content before content files of the selected channel. In one embodiment, after playing the selected channel, a mixture of globally popular and friend's channels (e.g. friends of requesting user or friends of the person's channel that was selected), or other mixture of two or more other channels, can be played to the user. In one embodiment, the mixture is a set percentage from each of the new channels. For example, for each new content item, a random number biased with the chosen percentage can be used to select which channel a new item is to come from. In one aspect, once the channel is chosen, the next item in that specific list is selected. In one implementation, a user can specific the mixture percentages, and even rate certain channels so that a percentage for each channel is determined from ratings.

In one embodiment, a collaborative filter can be used to find content that is similar to content that the user has selected as liking. For example, the secondary server can track content of content or links stored on it, and then determine which of those are similar. In one embodiment, the filter identifies similar content by identifying content that has been viewed by the same users. Other recommendation filters can also be used. In one implementation, this new content can be added as a new channel, as described above.

Figure 11:
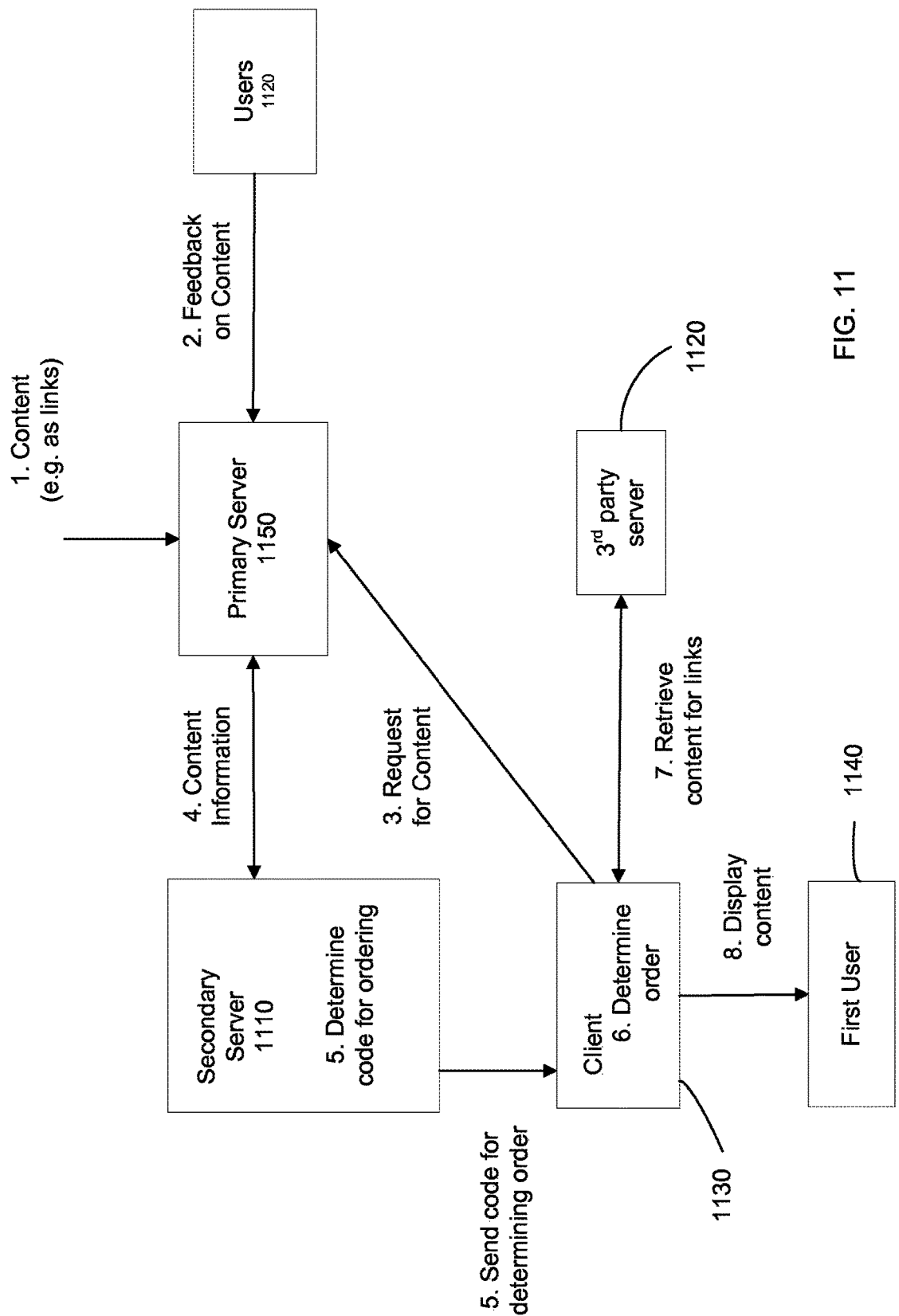
FIG. 11 is a block diagram showing interactions of content servers with clients and users according to embodiments of the present invention.

FIG. 11 is a block diagram showing interactions of content servers with clients and users according to embodiments of the present invention. Primary server 1160 can store content items (e.g. as files or links). The content can be received as described herein. Users 1120 can provide feedback to primary server as to content items in channels hosted by primary server 1150.

In response to input from a first user 1140, a client 1130 can send a request for content (e.g. a channel) from primary server 1150. Primary server 1150 can send content information to secondary server 1110, e.g., in response to the request for content from client 1130. Various embodiments of content information are described above. In one embodiment, secondary server 1110 can use the content information to determine which code should be used for ordering. For example, depending on the identity of the primary server or the requested channel, different code can be used. In another embodiment, the same code is determined regardless of the content information. In one aspect, the code can perform other functions besides ordering, such as determining where to obtain new content items and when to obtain them.

Once the ordering code has been determined, secondary server 1110 can send the code to client 1130. In one embodiment, secondary server 1110 can also send content items (e.g. links) to client 1130. In another embodiment, client 1130 can request content items from primary server 1150. Such a request can be in response to receiving the code, or be independent of receiving the code. For example, content items can be received by client 1130 in response to the request for the channel. Client 1130 can then determine an ordering of the content items using the code. In one implementation, secondary server 1110 can send an order list of links to client 1130, and not send code.

Once an order has been determined, client 1130 can identify the first content item to play, and potentially one or more of the following content items. If client 1130 only has a link to the first content item, the content file for the link can be retrieved, e.g., from third party server 1120. In one embodiment, client 1130 can maintain a queue of content files and of content item (e.g. if just links) to ensure a continuous playback of content, e.g., as described above. A reordering of content items can be performed periodically. In various embodiments, the reordering can occur based on what the person has watched (as opposed to skipped), what the person has liked, more user feedback, and additions of new content items to the requested channel. Any new information can be obtained from any server.

VIII. Computer Systems

Figure 12:
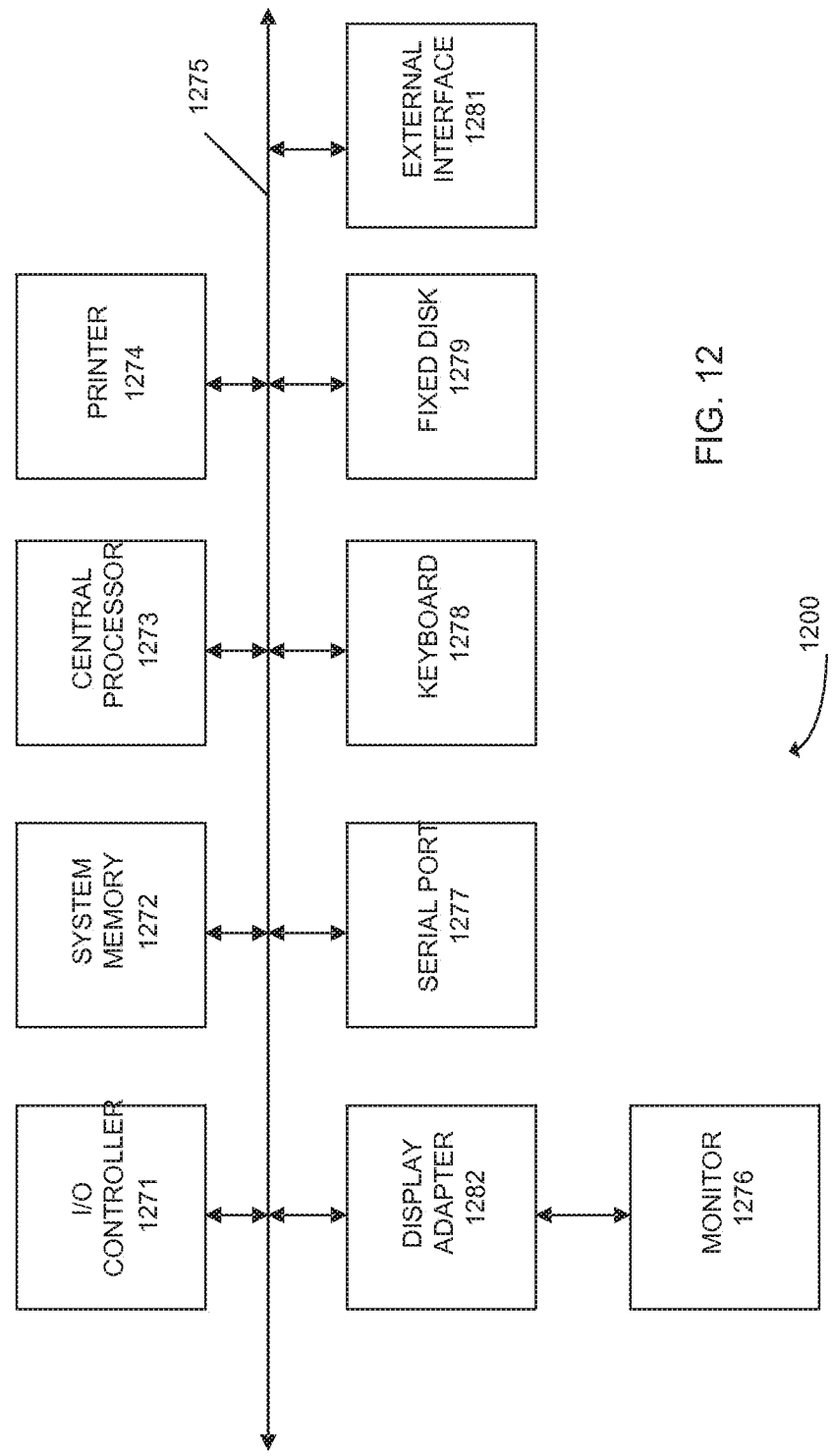
FIG. 12 shows a block diagram of an exemplary computer apparatus usable with system and methods according to embodiments of the present invention.

Any of the computer systems mentioned herein may utilize any suitable number of subsystems. Examples of such subsystems are shown in FIG. 12 in computer apparatus 1200. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 12 are interconnected via a system bus 1275. Additional subsystems such as a printer 1274, keyboard 1278, fixed disk 1279, monitor 1276, which is coupled to display adapter 1282, and others are shown. Peripherals and input/output (I/O) devices, which couple to I/O controller 1271, can be connected to the computer system by any number of means known in the art, such as serial port 1277. For example, serial port 1277 or external interface 1281 can be used to connect computer system 1200 to a wide area network such as the Internet, a mouse input device, or a scanner. The interconnection via system bus 1275 allows the central processor 1273 to communicate with each subsystem and to control the execution of instructions from system memory 1272 or the fixed disk 1279, as well as the exchange of information between subsystems. The system memory 1272 and/or the fixed disk 1279 may embody a computer readable medium. Any of the values mentioned herein can be output from one component to another component and can be output to the user.

A computer system can include a plurality of the same components or subsystems, e.g., connected together by external interface 1281 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application may be implemented as software code to be executed by a processor using any suitable computer language such as, for example, Java, C++, Python, or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

Any of the methods described herein may be totally or partially performed with a computer system including a processor, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method of presenting content by a client device, the method comprising performing by the client device:
   receiving content files associated with a first set of content items, the first set of content items being at a top of an ordered list of a plurality of content items;
   creating a queue of the received content files;
   upon presenting the received content files, reducing a number of remaining content files in the queue;
   determining whether the number of remaining content files in the queue is less than a threshold; and
   when the number of the remaining content files in the queue is less than the threshold, requesting one or more content files associated with a second set of content items, wherein the second set of content items are to be presented following the first set of content items.

2. The method of claim 1, wherein the received one or more content items comprise one or more picture files.

3. The method of claim 1, wherein the received one or more content items comprise one or more video files.

4. The method of claim 1, wherein the received one or more content items comprise links to one or more picture files or video files.

5. The method of claim 1, wherein the received one or more content items are transmitted from a first server, and the method further comprises:
   requesting a channel of content items from the first server, wherein the request is conveyed to a second server by the first server; and
   receiving, from the second server, code for determining whether the queue is less than the threshold.

6. The method of claim 5, further comprising:
   receiving, by the client device from the second server, code for determining an ordering of the ordered list of the plurality of content items.

7. The method of claim 5, wherein the plurality of content items include links associated with the received one or more content items, and the method further comprises:
   displaying images referenced by links for the requested channel that were received from the first server;
   determining whether remaining links for the requested channel are less than a second threshold;
   when the remaining links are less than the second threshold, automatically retrieving links at least from the second server; and presenting second images referenced by the links from the second server by the client device.

8. The method of claim 7, wherein the second images referenced by the links from the second server are displayed interspersed with third images referenced by links from the first server, the third images not being from the requested channel.

9. The method of claim 8, wherein the interspersing is performed such that a specified percentage of the second images or the third images are presented by the client device.

10. The method of claim 1, further comprising:
determining a rating threshold; and
adjusting the ordered list of the plurality of content items based in part on the rating threshold.

11. The method of claim 1, further comprising:
determining a date associated with the received one or more content items; and
adjusting the ordered list of the plurality of content items based in part on the date associated with the received one or more content items.

12. A non-transitory computer readable medium storing a plurality of instructions for controlling a processor to perform an operation for presenting content, wherein, when the plurality of instructions being executed, the processor is configured to perform:
receiving content files associated with a first set of content items, the first set of content items being at a top of an ordered list of a plurality of content items;
creating a queue of the received content files;
upon presenting the received content files, reducing a number of remaining content files in the queue;
determining whether the number of remaining content files in the queue is less than a threshold; and
when the number of the remaining content files in the queue is less than the threshold, requesting one or more content files associated with a second set of content items, wherein the second set of content items are to be presented following the first set of content items.

13. An apparatus comprising:
a memory that stores computer-executable instructions; and
a processor configured to access the memory and execute the computer-executable instructions to collectively at least:
receive content files associated with a first set of content items, the first set of content items being at a top of an ordered list of a plurality of content items;
create a queue of the received content files;
upon presenting the received content files, reduce a number of remaining content files in the queue;
determine whether the number of remaining content files in the queue is less than a threshold; and
when the number of the remaining content files in the queue is less than the threshold, request one or more content files associated with a second set of content items, wherein the second set of content items are to be presented following the first set of content items.

* * * * *